US012607952B2

(12) United States Patent
Suzuki et al.

(10) Patent No.: US 12,607,952 B2
(45) Date of Patent: Apr. 21, 2026

(54) IMAGE FORMING APPARATUS AND DEVELOPER SUPPLY DEVICE THAT IS DETACHABLE FROM AND ATTACHABLE TO THE IMAGE FORMING APPARATUS

(71) Applicants: Michiharu Suzuki, Kanagawa (JP); Naoto Suzuki, Kanagawa (JP); Kenji Honjoh, Kanagawa (JP); Nobuo Kuwabara, Kanagawa (JP); Yuta Azeyanagi, Kanagawa (JP); Haruki Nagata, Kanagawa (JP); Shota Yamamoto, Kanagawa (JP)

(72) Inventors: Michiharu Suzuki, Kanagawa (JP); Naoto Suzuki, Kanagawa (JP); Kenji Honjoh, Kanagawa (JP); Nobuo Kuwabara, Kanagawa (JP); Yuta Azeyanagi, Kanagawa (JP); Haruki Nagata, Kanagawa (JP); Shota Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/681,564

(22) PCT Filed: Jun. 30, 2022

(86) PCT No.: PCT/IB2022/056093

§ 371 (c)(1),
(2) Date: Feb. 6, 2024

(87) PCT Pub. No.: WO2023/012544

PCT Pub. Date: Feb. 9, 2023

(65) Prior Publication Data

US 2024/0337968 A1 Oct. 10, 2024

(30) Foreign Application Priority Data

Aug. 6, 2021 (JP) ................................ 2021-129742

(51) Int. Cl.
*G03G 15/08* (2006.01)
*G03G 21/16* (2006.01)

(52) U.S. Cl.
CPC ..... *G03G 15/0891* (2013.01); *G03G 15/0865* (2013.01); *G03G 15/0879* (2013.01);
(Continued)

(58) Field of Classification Search
CPC ........... G03G 15/0891; G03G 15/0865; G03G 15/0886; G03G 15/0896; G03G 21/1633;
(Continued)

(56) References Cited

U.S. PATENT DOCUMENTS 4,768,055 A * 8/1988 Takamatsu ......... G03G 15/0822 399/102
6,091,912 A * 7/2000 Kitajima ............ G03G 15/0879 399/119
(Continued)

FOREIGN PATENT DOCUMENTS

EP 3407140 A1 11/2018
JP 2003-029514 A 1/2003
(Continued)

OTHER PUBLICATIONS

International Search Report and Written Opinion issued on Sep. 29, 2022 in PCT/IB2022/056093 filed on Jun. 30, 2022, 10 pages.

*Primary Examiner* — Stephanie E Bloss
*Assistant Examiner* — Laura Roth
(74) *Attorney, Agent, or Firm* — XSENSUS LLP

(57) ABSTRACT

A developer supply device for supplying developer contained in a developer container toward a developing device in an apparatus body of an image forming apparatus includes a conveyance passage, a developer receiving portion, a sub-hopper, and a conveying tube. The conveyance passage delivers the developer discharged from the developer con-
(Continued)

tainer. The developer receiving portion is detachable and attachable with respect to the developer container. The sub-hopper is detachable and attachable with respect to the developing device and stores the developer discharged toward the developing device. The flexible conveying tube has a first end portion coupled to the developer receiving portion and a second end portion coupled to the sub-hopper, and conveys the developer from the developer receiving portion to the sub-hopper. The developer supply device is detachable from and attachable to the apparatus body with a connection among the developer receiving portion, the sub-hopper, and the conveying tube being maintained.

18 Claims, 8 Drawing Sheets

(52) U.S. Cl.
CPC ..... *G03G 15/0886* (2013.01); *G03G 15/0896* (2013.01); *G03G 21/1633* (2013.01); *G03G 21/1647* (2013.01)

(58) Field of Classification Search
CPC ........... G03G 15/0879; G03G 15/0867; G03G 15/0877; G03G 15/0898; G03G 21/1647; G03G 21/105; G03G 2221/1624
See application file for complete search history.

(56) References Cited

U.S. PATENT DOCUMENTS

| | | | | |
|---|---|---|---|---|
| 6,151,471 | A * | 11/2000 | Yahata ............... | G03G 15/0822 399/258 |
| 2007/0077097 | A1* | 4/2007 | Watanabe .......... | G03G 21/1647 399/258 |
| 2008/0031657 | A1* | 2/2008 | Okuda ............... | G03G 15/0879 399/258 |
| 2009/0003865 | A1* | 1/2009 | Endou ................ | G03G 15/0844 399/359 |
| 2018/0321615 | A1 | 11/2018 | Suzuki et al. | |
| 2018/0335721 | A1* | 11/2018 | Koike ................ | G03G 15/6585 |
| 2019/0212668 | A1 | 7/2019 | Koike et al. | |
| 2019/0227479 | A1 | 7/2019 | Suzuki et al. | |

FOREIGN PATENT DOCUMENTS

| | | | |
|---|---|---|---|
| JP | 2014-145793 | A | 8/2014 |
| JP | 2018-197766 | A | 12/2018 |
| JP | 2019-128413 | A | 8/2019 |
| JP | 2019-152810 | A | 9/2019 |
| JP | 2021-189194 | A | 12/2021 |
| WO | 2021/040782 | A1 | 3/2021 |

* cited by examiner

IMAGE FORMING APPARATUS AND DEVELOPER SUPPLY DEVICE THAT IS DETACHABLE FROM AND ATTACHABLE TO THE IMAGE FORMING APPARATUS

CROSS-REFERENCE TO RELATED APPLICATIONS

The present application is based on PCT filing PCT/IB2022/056093, filed Jun. 30, 2022, which claims priority to Japanese Patent Application No. 2021-129742, filed Aug. 6, 2021, the entire disclosure of each is hereby incorporated by reference.

TECHNICAL FIELD

Embodiments of the present disclosure relate to a developer supply device that supplies developer contained in a developer container to a developing device, and an image forming apparatus, such as a copier, a printer, a facsimile machine, or a multifunction peripheral (MFP) having at least two of such capabilities, incorporating the developer supply device.

BACKGROUND ART

In the related art, as an image forming apparatus such as a copier, a printer, a facsimile machine, or a multifunction peripheral (MFP), an image forming apparatus is widely known in which a developing device, a developer supply device, and a developer container are replaceable with ones corresponding to developers of different colors (e.g., see PTL 1).

Specifically, an image forming apparatus in PTL 1 includes a developing device, a developer supply device, and a developer container for a special color such as a clear color or a white color, in addition to developing devices, developer supply devices, and developer containers for four colors (yellow, magenta, cyan, and black) for forming a normal color image. In particular, the developing device, the developer supply device, and the developer container for the special color are replaced relatively frequently with a different type of devices. Each of the plurality of developer supply devices supplies the developer discharged from the developer container of the corresponding color to the developing device of the corresponding color. The developer discharged from the developer container is temporarily stored in a storage portion (a developer receiving portion). The storage portion and a conveying pump disposed in a sub-hopper are coupled by a flexible tube (a conveying tube). The conveying pump operates so that the developer stored in the storage portion is conveyed toward the sub-hopper via the tube. A conveying screw disposed in the sub-hopper is driven to rotate so that the developer conveyed toward and stored in the sub-hopper is discharged from a discharge port of the sub-hopper. Thus, the developer is appropriately supplied toward the developing device. The developing device, to which the developer is appropriately supplied and in which an appropriate amount of developer is contained, develops a latent image formed on a surface of a photoconductor drum. Accordingly, toner images of the respective colors developed on the surfaces of the respective photoconductor drums are overlaid on the surface of an intermediate transferor to form an image of a plurality of colors.

CITATION LIST

Patent Literature

[PTL 1]
Japanese Unexamined Patent Application Publication No. 2019-152810

SUMMARY OF INVENTION

Technical Problem

In the technology of PTL 1 described above, an operation of attaching and detaching the developer supply device to and from an apparatus body of the image forming apparatus is time-consuming.

The present disclosure has been made to solve the above-described problem. An object of the present disclosure is to provide a developer supply device that can be easily attached to and detached from an apparatus body of an image forming apparatus, and the image forming apparatus including the developer supply device.

Solution to Problem

A developer supply device according to an embodiment of the present disclosure supplies developer contained in a developer container toward a developing device in an apparatus body of an image forming apparatus. The developer supply device includes a conveyance passage, a developer receiving portion, a sub-hopper, and a conveying tube. The conveyance passage delivers the developer discharged from the developer container. The developer receiving portion is detachable and attachable with respect to the developer container. The sub-hopper is detachable and attachable with respect to the developing device and stores the developer discharged toward the developing device. The conveying tube having flexibility has a first end portion coupled to the developer receiving portion and a second end portion coupled to the sub-hopper, and conveys the developer from the developer receiving portion to the sub-hopper. The developer supply device is detachable from and attachable to the apparatus body of the image forming apparatus with a connection among the developer receiving portion, the sub-hopper, and the conveying tube being maintained.

Advantageous Effects of Invention

According to the present disclosure, a developer supply device that can be easily attached to and detached from an apparatus body of an image forming apparatus and the image forming apparatus including the developer supply device can be provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
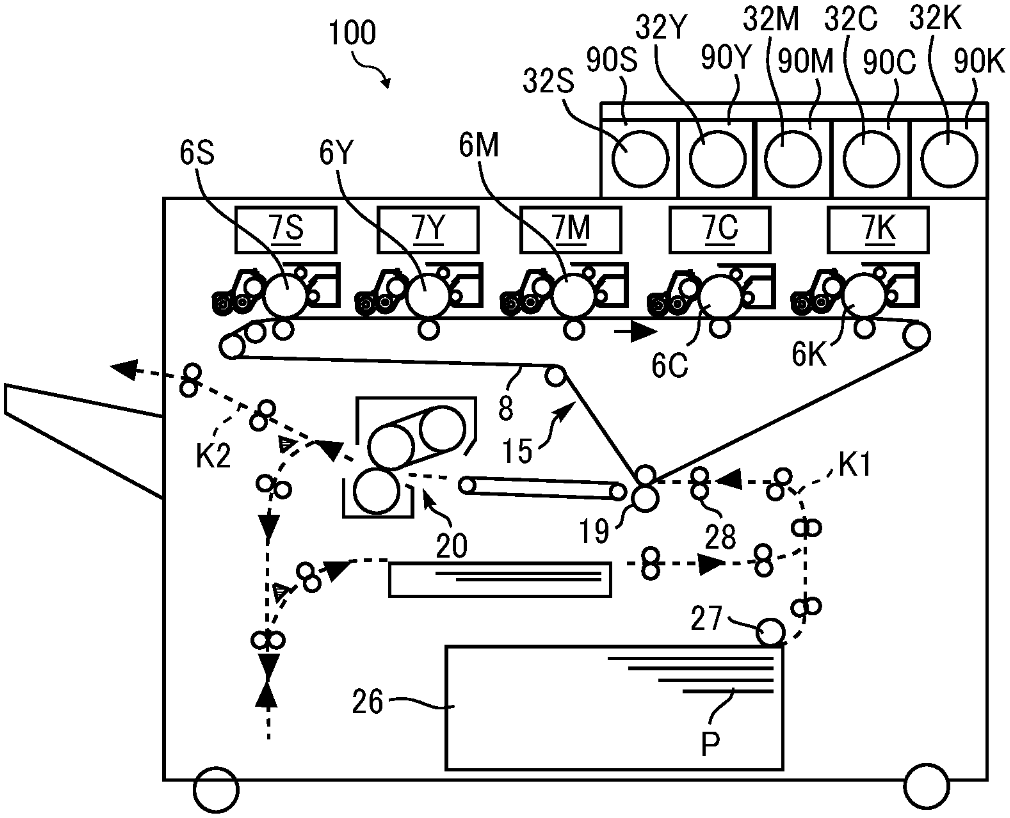
FIG. 1 is a diagram illustrating an overall configuration of an image forming apparatus according to an embodiment of the present disclosure.

The terminology used herein is for the purpose of describing particular embodiments only and is not intended to be limiting of the present invention. As used herein, the singular forms "a," "an," and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Below, embodiments of the present disclosure are described in detail with reference to the drawings. Note that identical reference numerals are assigned to identical or equivalent components and a redundant description of those components may be simplified or omitted.

Figure 2:
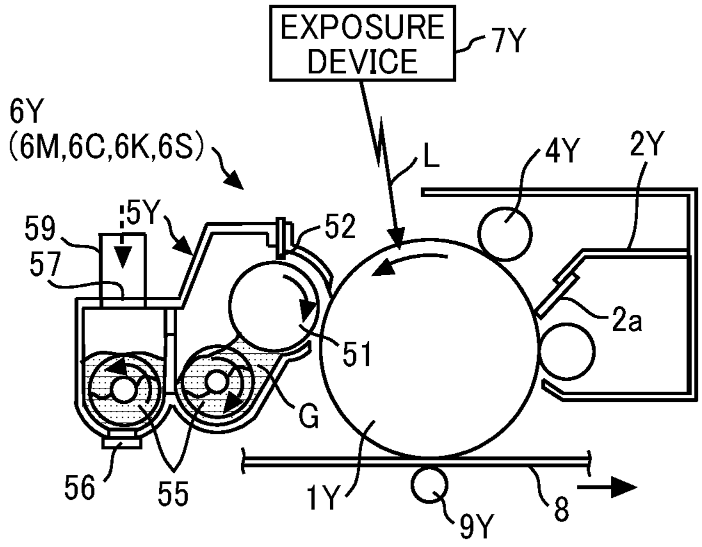
FIG. 2 is a cross-sectional view of a vicinity of a process cartridge in the image forming apparatus in FIG. 1.

With reference to FIGS. 1 and 2, a description is given of the overall configuration and operation of an image forming apparatus 100 according to an embodiment of the present disclosure. FIG. 1 is a view of a printer serving as an image forming apparatus. FIG. 2 is an enlarged view of a process cartridge 6Y and the vicinity thereof in the printer illustrated in FIG. 1. As illustrated in FIG. 1, five toner containers 32Y, 32M, 32C, 32K, and 32S serving as substantially cylindrical developer containers of different colors are detachably arranged side by side on one upper end side of an apparatus body of the image forming apparatus 100. Toners as developers contained in the toner containers 32Y, 32M, 32C, 32K, and 32S (serving as the developer containers) are conveyed and supplied toward the developing devices 5Y, 5M, 5C, 5K, and 5S (see FIG. 3) by developer supply devices 90Y, 90M, 90C, 90K, and 90S (toner supply devices), respectively.

Specifically, as illustrated in FIG. 1, the toner container 32K (of the developer supply device 90K) corresponding to black is disposed on the right side. On the left side thereof, the toner containers 32Y, 32M, and 32C (of the developer supply devices 90Y, 90M, and 90C) corresponding to three colors (yellow, magenta, and cyan) for colors are disposed in the order of yellow, magenta, and cyan from the left side. On the leftmost side thereof, the toner container 32S (of the developer supply device 90S) corresponding to the special color is disposed. In particular, the toner container 32S corresponding to the special color is often replaced with a toner container 32S for another type of the special color depending on a user's usage before all of the toner contained therein is consumed. In the present embodiment, such an arrangement order (arrangement) of the toner containers 32Y, 32M, 32C, 32K, and 32S, the developer supply devices 90Y, 90M, 90C, 90K, and 90S, and the developing devices 5Y, 5M, 5C, 5K, and 5S (of the process cartridges 6Y, 6M, 6C, 6K, and 6S) can be changed.

With reference to FIG. 1, the developer supply device 90K for black supplies black toner (developer) contained in the toner container 32K for black to the developing device 5K for black. The three developer supply devices 90Y, 90M, and 90C for colors supply color toners of yellow, magenta, and cyan (developers) contained in the toner containers 32Y, 32M, and 32C (developer containers) for colors to the developing devices 5Y, 5M, and 5C for colors, respectively. The developer supply device 90S for the special color supplies special-color toner (developer) contained in the toner container 32S (developer container) for the special color to the developing device 5S for the special color.

Known toners can be used as the black toner, the color toners (yellow toner, magenta toner, and cyan toner), and a special toner. In particular, the special toner is different from the black toner or the color toners. A known clear toner (for example, a transparent toner, a colorless toner, an achromatic toner, or a non-pigmented toner), a white toner, a gold toner, and a silver toner can be used depending on a user's usage.

With reference to FIG. 1, five exposure devices 7Y, 7M, 7C, 7K, and 7S are disposed in an upper section of the apparatus body of the image forming apparatus 1. The process cartridges 6Y, 6M, 6C, 6K, and 6S (developing devices 5Y, 5M, 5C, 5K, and 5S) corresponding to yellow, magenta, cyan, black, and special color are disposed side by side facing an intermediate transfer belt unit 15 (intermediate transfer belt 8) below the exposure devices 7Y, 7M, 7C, 7K, and 7S. As illustrated in FIG. 1, the basic order (arrangement) of the five process cartridges 6Y, 6M, 6C, 6K, and 6S (developing devices 5Y, 5M, 5C, 5K, and 5S) is an order of the process cartridge 6S (developing device 5S) for special color, the process cartridge 6Y (developing device 5Y) for yellow, the process cartridge 6M (developing device 5M) for magenta, the process cartridge 6C (the developing device 5C) for cyan, and the process cartridge 6K (developing device 5K) for black from upstream side in the traveling direction of the intermediate transfer belt 8. The basic order (arrangement) can be appropriately changed depending on a user's usage. In particular, in the present embodiment, referring also to FIGS. 7A and 7B, the arrangement of the developing device 5K (process cartridge 6K), the developer supply device 90K, and the toner container 32K for black, and the arrangement of the developing device 5S (process cartridge 6S), the developer supply device 90S, and the toner container 32S for special color can be changed.

Figure 7A:
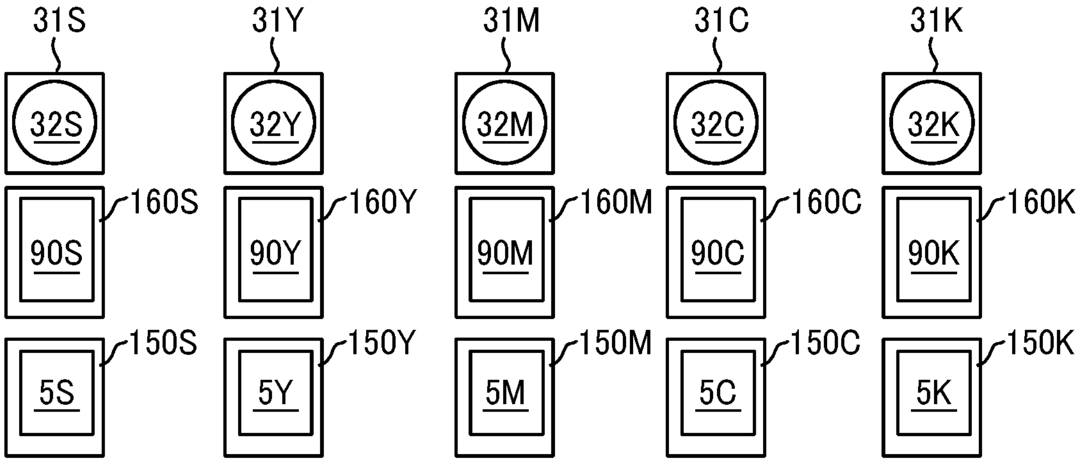
FIG. 7A is diagram illustrating a state in which developing devices, toner containers, and developer supply devices of a plurality of colors are attached to the apparatus body of the image forming apparatus.
Figure 7B:
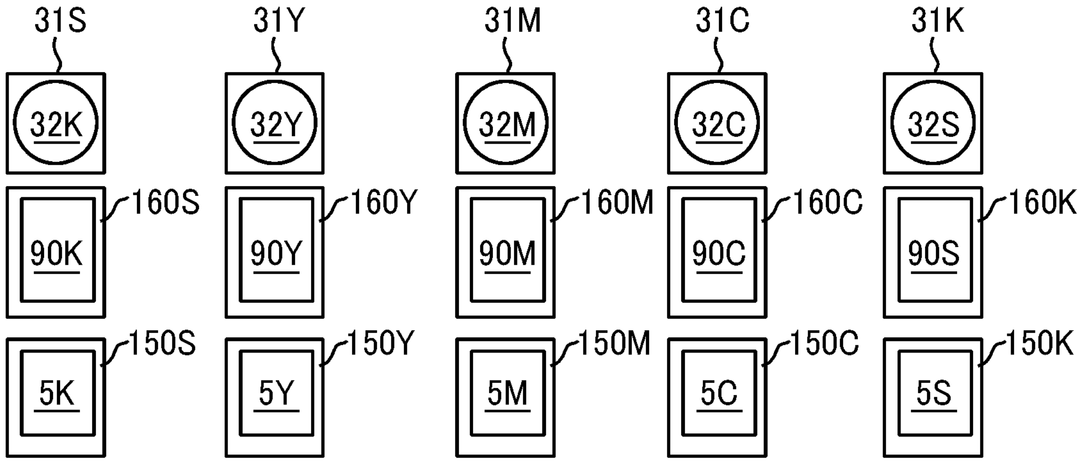
FIG. 7B is diagram illustrating a state in which a developing device, a toner container, and a developer supply device for a special color are disposed at the most downstream in a traveling direction of an intermediate transfer belt in FIG. 7A.

The special-color toner is not limited to one type, a different type of toner container 32S for a special color is often replaced as appropriate depending on a user's usage. For example, the toner container 32S for clear toner may be replaced with the toner container 32S for white toner. In such a case, depending on the type of special-color toner, the order (arrangement) of the process cartridge 6S (developing device 5S) for special color may be preferably changed from the most upstream side to the most downstream side in the traveling direction of the intermediate transfer belt 8. For example, when the clear toner is used as the special-color toner, the clear toner is desirably primarily transferred onto the intermediate transfer belt 8 first since the clear toner is used for the purpose of improving glossiness of an image. As illustrated in FIGS. 1 and 7A, the developing device 5S (process cartridge 6S) for the special color is disposed on the most upstream side in the traveling direction of the intermediate transfer belt 8. On the other hand, when white toner is used as the special-color toner, the white toner is desirably secondarily transferred onto the bottom layer on the sheet P since the white toner is used for the purpose of forming an image on a colored (not white) sheet P. As illustrated in FIG. 7B, the developing device 5S (process cartridge 6S) for the special color is disposed on the most downstream side in the traveling direction of the intermediate transfer belt 8. In accordance with the change of the arrangement (installation position) of the developing device 5S (process cartridge 6S) for special color, the arrangement of the developing device 5K (process cartridge 6K) for black color is changed to be replaced. In accordance with above-described change, as illustrated in FIGS. 7A and 7B, the installation positions of the developer supply device 90S and the toner container 32S for special-color are replaced with the installation positions of the developer supply device 90K and the toner container 32K for black. These replacement operations are manually performed by an operator such as a user or a service person based on an operation manual displayed on a display panel disposed in an exterior portion of the image forming apparatus 100. When the arrangement of the toner containers 32Y, 32M, 32C, 32K, and 32S, the process cartridges 6Y, 6M, 6C, 6K, and 6S (developing devices 5Y, 5M, 5C, 5K, and 5S), and the developer supply devices 90Y, 90M, 90C, 90K, and 90S is changed, the arrangement of the devices having the same color is replaced together in order to prevent different colors from being mixed.

With reference to FIG. 2, the process cartridge 6Y corresponding to yellow is a unit (attachable-detachable unit) in which a photoconductor drum 1Y as an image bearer, a charging device 4Y, the developing device 5Y, and a cleaning device 2Y are integrated. The charging device 4Y, the developing device 5Y, and the cleaning device 2Y are disposed around the photoconductor drum 1Y. A series of image forming processes including charging, exposure, developing, primary transfer, cleaning, and discharge processes is performed on the photoconductor drum 1Y. Accordingly, a yellow image is formed on the surface of the photoconductor drum 1Y.

Note that the other four process cartridges 6M, 6C, 6K, and 6S have a configuration similar to that of the process cartridge 6Y for yellow except for the color of toner used therein, and form magenta, cyan, black, and special color toner images, respectively. Hereinafter, only the process cartridge 6Y is described below, and descriptions of the other process cartridges 6M, 6C, 6K, and 6S are appropriately omitted.

With reference to FIG. 2, the photoconductor drum 1Y as the image bearer is driven to rotate counterclockwise indicated by an arrow in FIG. 2 by a drive motor. The charging device 4Y uniformly charges the surface of the photoconductor drum 1Y (a charging process). When the surface of the photoconductor drum 1Y reaches a position at which the surface of the photoconductor drum 1Y is irradiated with laser beam L emitted from the exposure device 7Y (writing device), the photoconductor drum 1Y is scanned with the laser beam L. Thus, an electrostatic latent image corresponding to yellow is formed on the photoconductor drum 1Y (an exposure process).

When the surface of the photoconductor drum 1Y reaches a position facing the developing device 5Y, the electrostatic latent image is developed with toner into a yellow toner image (a development process). When the surface of the photoconductor drum 1Y bearing the toner image reaches a position facing a primary transfer roller 9Y via the intermediate transfer belt 8 as an intermediate transferor, the toner image on the photoconductor drum 1Y is transferred onto the intermediate transfer belt 8 (a primary transfer process). After the primary transfer process, a slight amount of untransferred toner remains on the photoconductor drum 1Y.

When the surface of the photoconductor drum 1Y reaches a position facing the cleaning device 2Y, a cleaning blade 2*a* collects the untransferred toner from the photoconductor drum 1Y into the cleaning device 2Y (a cleaning process). Finally, the surface of the photoconductor drum 1Y reaches a position facing a discharging device, and residual potential on the photoconductor drum 1 is removed at this position (a discharging process). Thus, a series of image forming processes performed on the surface of the photoconductor drum 1Y is completed.

Note that the above-described image forming processes are performed in the process cartridges 6M, 6C, 6K and 6S similarly to the process cartridge 6Y for yellow. That is, the exposure devices 7M, 7C, 7K, and 7S disposed above the process cartridges 6M, 6C, 6K, and 6S irradiate respective photoconductor drums 1M, 1C, 1K, and 1S of the process cartridges 6M, 6C, 6K, and 6S with the laser beams L based on image data. Specifically, the exposure device 7 includes a light source to emit the laser beams L, multiple optical elements, and a polygon mirror rotated by a motor. The exposure device 7 scans, with the laser beams L, the photoconductor drums 1M, 1C, 1K and 1S via the multiple optical elements while deflecting the laser beams L with the polygon mirror. Then, toner images formed on the photoconductor drums 1Y, 1M, 1C, 1K and 1S through the development process are primarily transferred and superimposed onto the intermediate transfer belt 8. Thus, a desired color toner image is formed on the intermediate transfer belt 8.

In FIG. 1, the intermediate transfer belt unit 15 (intermediate transfer belt device) includes the intermediate transfer belt 8 as the intermediate transferor, the five primary transfer rollers 9Y, 9M, 9C, 9K, and 9S, a driving roller, a secondary transfer counter roller, multiple tension rollers, a cleaning counter roller, and an intermediate transfer belt cleaner. The intermediate transfer belt 8 (intermediate transferor) is supported by and entrained around multiple rollers to rotate in the rotation direction (clockwise) indicated by an arrow illustrated in FIG. 1 as one (drive roller) of the multiple rollers rotates.

Each of the five primary transfer rollers 9Y, 9M, 9C, 9K and 9S nip the intermediate transfer belt 8 with the corresponding one of the photoconductor drums 1Y, 1M, 1C, 1K and 1S to form an area of contact, herein called a primary transfer nip, between the intermediate transfer belt 8 and the corresponding one of the photoconductor drums 1Y, 1M, 1C, 1K and 1S. A transfer voltage (primary transfer bias) opposite in polarity to toner is applied to the primary transfer rollers 9Y, 9M, 9C, 9K and 9S. The intermediate transfer belt 8 travels in the direction indicated by an arrow in FIG. 1 and sequentially passes through the primary transfer nips of the primary transfer rollers 9Y, 9M, 9C, 9K, and 9S. Then, the single-color toner images on the photoconductor drums 1Y, 1M, 1C, 1K and 1S, having the respective colors, are primarily transferred to and superimposed onto the intermediate transfer belt 8, thereby forming the multicolor toner image.

Subsequently, the intermediate transfer belt 8, which the toner images of the respective colors are transferred to and superimposed onto, reaches a position opposite a secondary transfer roller 19. At this position, the intermediate transfer belt 8 is nipped between the secondary transfer counter roller and the secondary transfer roller 19 to form a secondary transfer nip. The toner images of four colors formed on the intermediate transfer belt 8 are transferred onto a sheet P such as a sheet of paper conveyed to the position of the secondary transfer nip (a secondary transfer process). At this time, the untransferred toner, untransferred on the sheet P, may remain on the intermediate transfer belt 8 as residual toner.

After that, the surface of the intermediate transfer belt 8 reaches a position opposite the intermediate transfer belt cleaner. At the position, the intermediate transfer belt cleaner removes the untransferred toner from the intermediate transfer belt 8. Thus, a series of transfer processes performed on the intermediate transfer belt 8 is completed.

With reference to FIG. 1, the sheet P is conveyed from a sheet feeder 26 (sheet tray) disposed in a lower portion of the apparatus body of the image forming apparatus 100 to the secondary transfer nip through a conveyance passage K1 along which a feed roller 27 and a registration roller pair 28 are disposed. Specifically, the sheet feeder 26 contains a stack of multiple sheets P. As the feed roller 27 is rotated counterclockwise in FIG. 1, the feed roller 27 feeds a top sheet P of the stack of multiple sheets P in the sheet feeder 26 toward a roller nip between the registration roller pair 28.

The sheet P conveyed to the registration roller pair 28 (timing roller pair) temporarily stops at a position of the roller nip between the rollers of the registration roller pair 28 that has stopped rotating. Rotation of the registration roller pair 28 is timed to convey the sheet P toward the secondary transfer nip such that the sheet P meets the color toner image on the intermediate transfer belt 8 at the secondary transfer nip. Thus, the desired color toner image is transferred onto the sheet P.

Subsequently, the sheet P, onto which the color toner image is transferred at the secondary transfer nip, is conveyed to a position of a fixing device 20. In the fixing device 20, the color toner image is fixed onto the sheet P under heat and pressure from a fixing belt and a pressure roller (a fixing process). The sheet P is conveyed through an ejection passage K2 and ejected by an output roller pair to the outside of the image forming apparatus 100. The sheets P ejected by the output roller pair to the outside the image forming apparatus 100 are sequentially stacked as output images on a stack tray. Thus, a series of image forming processes performed by the image forming apparatus 100 is completed.

Next, a configuration and operation of the developing device 5Y of the process cartridge 6Y are described in further detail below with reference to FIG. 2. The developing device 5Y includes a developing roller 51 facing the photoconductor drum 1Y, a doctor blade 52 facing the developing roller 51, two conveying screws 55 disposed in a developer housing, a toner concentration sensor 56 for detecting the concentration of toner in the developer, and a supply tube 59 for supplying toner to the developer housing through an opening 57. The developing roller 51 includes magnets and a sleeve. The magnets are fixed inside the developing roller 51. The sleeve rotates around the magnets. The developer housing contains the two-component developer G including carrier and toner.

The developing device 5Y described above operates as follows. The sleeve of the developing roller 51 rotates in the direction indicated by an arrow in FIG. 2. The developer G is borne on the developing roller 51 by a magnetic field generated by the magnets. As the sleeve rotates, the developer G moves along the circumference of the developing roller 51.

The developer G in the developing device 5Y is adjusted so that the ratio of toner (toner concentration) in the developer G is within a predetermined range. Specifically, according to the consumption of the toner in the developing device 5Y (developer housing), the developer supply device 90Y (see FIG. 1) supplies toner from the toner container 32Y (developer container) to the developing device 5Y. A configuration and operation of the toner container 32Y and the developer supply device 90Y are described in further detail below.

The toner supplied in the developing device 5Y is mixed and stirred by the two conveying screws 55 together with the developer G and circulated through the two developer housings which is separated by the wall (movement in a longitudinal direction perpendicular to the plane on which FIG. 2 is illustrated). The toner in the two-component developer G is triboelectrically charged by friction together with the carrier and thus is attracted to the carrier. Both the toner and the carrier are borne on the developing roller 51 due to a magnetic force generated on the developing roller 51.

The developer G borne on the developing roller 51 is conveyed along an outer circumference of the sleeve in a direction indicated by an arrow in FIG. 2 and reaches a position opposite the doctor blade 52. The doctor blade 52 adjusts the amount of the developer G borne on the developing roller 51 to an appropriate amount. Thereafter, the developer G on the developing roller 51 is conveyed to a position opposite the photoconductor drum 1Y (developing area). The toner is attracted to the latent image formed on the photoconductor drum 1Y by an electric field generated in the developing area. Subsequently, as the sleeve rotates, the developer G remaining on the developing roller 51 reaches an upper portion of the developer housing, separates from the developing roller 51, and returns to the developer housing.

Figure 3:
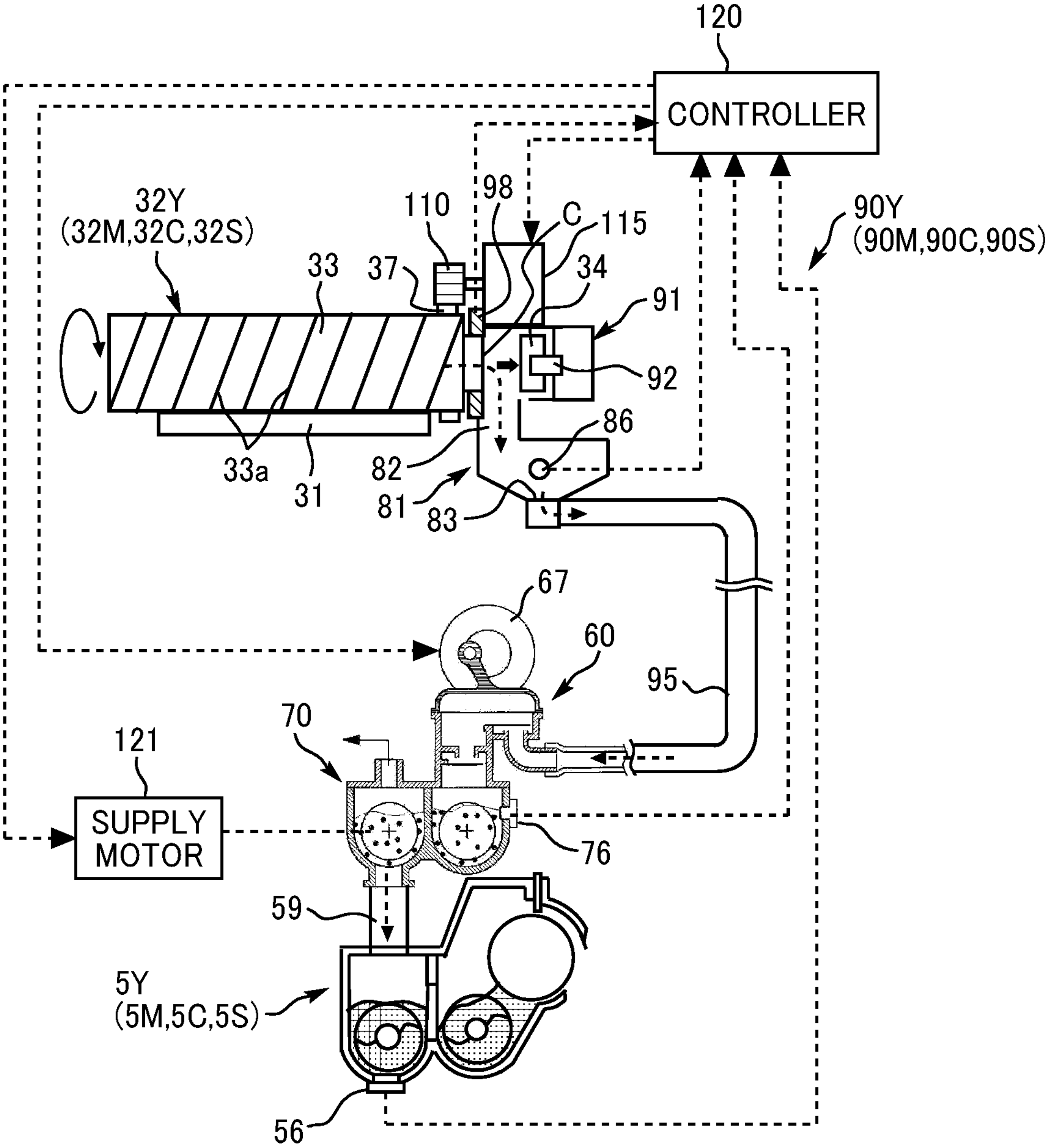
FIG. 3 is a diagram of a developer supply device, a developing device, and a toner container.

Next, with reference to FIG. 3, a configuration and operation of the developer supply device 90Y for yellow are briefly described. In the present embodiment, the other four developer supply devices 90M, 90C, 90K, and 90S have substantially the same configuration as that of the developer supply device 90Y for yellow except that the color (type) of toner used is different. Thus, the description of the developer supply devices 90M, 90C, 90K, and 90S is appropriately omitted, and only the description of the developer supply device 90Y for yellow is given.

The developer supply device 90Y for yellow drives the toner container 32Y disposed in a developer container mount 31Y for yellow to rotate the toner container 32Y in a predetermined direction (direction indicated by an arrow in FIG. 3) to discharge the toner contained in the toner container 32Y to the outside of the container and guide the toner to the yellow developing device 5Y and forms a toner supply passage (toner conveyance passage). In FIG. 3, the arrangement direction of the toner container 32Y, the developer supply device 90Y, and the developing device 5Y is changed to facilitate understanding. Actually, in FIG. 3, the longitudinal direction of the toner container 32Y and a part of the developer supply device 90Y is perpendicular to the plane on which FIG. 3 is illustrated (see FIG. 1). In addition, the orientation and arrangement of a tube 95 (serving as a conveying tube) are also simplified and illustrated.

The toner in the toner container 32Y disposed in the developer container mount 31Y of the apparatus body of the image forming apparatus 100 is appropriately supplied into the developing device 5Y by the developer supply device 90Y in accordance with consumption of the toner in the developing device 5Y. Specifically, when the toner container 32Y is set in the developer container mount 31Y of the apparatus body of the image forming apparatus 100, a bottle gear 37 of the toner container 32Y meshes with a drive gear 110 of the apparatus body of the image forming apparatus 100. Thus, a cap 34 (which is a member for closing a toner discharge port C) is removed from the toner container 32Y by a cap opening-and-closing chuck 92 of a cap receiving portion 91. As a result, the toner discharge port C (opening portion) of the toner container 32Y is opened, and the yellow toner contained in the toner container 32Y is discharged through the toner discharge port C.

On the other hand, the developer supply device 90Y includes a developer receiving portion (receptacle) 81 having a dropping passage 82 below the opened toner discharge port C. A suction port 83 is disposed in a bottom portion of the developer receiving portion 81 and is connected to one end of the tube 95 (conveying tube) via a nozzle 93 (serving as a conveyance passage). The tube 95 is a flexible conveying tube made of a flexible rubber material having low toner affinity. The other end of the tube 95 is coupled to a conveying pump 60 of a sub-hopper 70. The sub-hopper 70 is coupled to the supply tube 59 of the developing device 5Y. With such a configuration of the developer supply device 90Y, a drive motor 115 drive the drive gear 110 to rotate a container body 33 of the toner container 32Y in a predetermined direction. Thus, the toner is discharged from the toner discharge port C of the toner container 32Y. The toner discharged from the toner container 32Y falls through the dropping passage 82 and is stored in the developer receiving portion 81. The toner stored in the developer receiving portion 81 is sucked from the suction port 83 by an operation of the conveying pump 60 and is conveyed from the conveying pump 60 toward the storage portion of the sub-hopper 70 via the tube 95. Then, the toner conveyed and stored in the sub-hopper 70 is supplied into the developing device 5Y through the supply tube 59. That is, the toner in the toner container 32Y is conveyed in the direction indicated by dashed arrows in FIG. 3. In the present embodiment, unlike the tube 95, the supply tube 59 (conveying tube) in the developing device 5Y is formed of a hard resin material or a metal material that is hardly deformed.

With reference to FIG. 3, in the present embodiment, the developer receiving portion 81 is provided with a set detecting portion 98 (serving as a set detector) that detects the presence or absence of a normal set of the toner container 32Y in a state of being attached to the apparatus body of the image forming apparatus 100. Specifically, the set detecting portion 98 (set detector) is provided with a photosensor that optically detects a state in which a portion (a head portion) of the toner container 32Y where the toner discharge port C is formed is set at a normal position. A detection result by the set detecting portion 98 is transmitted to a controller 120, and the detection result is displayed on a display panel. As a result, a user knows whether a desired toner container has been set and redoes the above-described operation as necessary. In the present embodiment, the set detecting portion 98 is provided with a lock mechanism that locks the toner container 32Y set at the position so that the toner container 32Y does not come off. Accordingly, the set detecting portion 98 also detects the presence or absence of a setting failure in the toner container 32Y.

Figure 4:
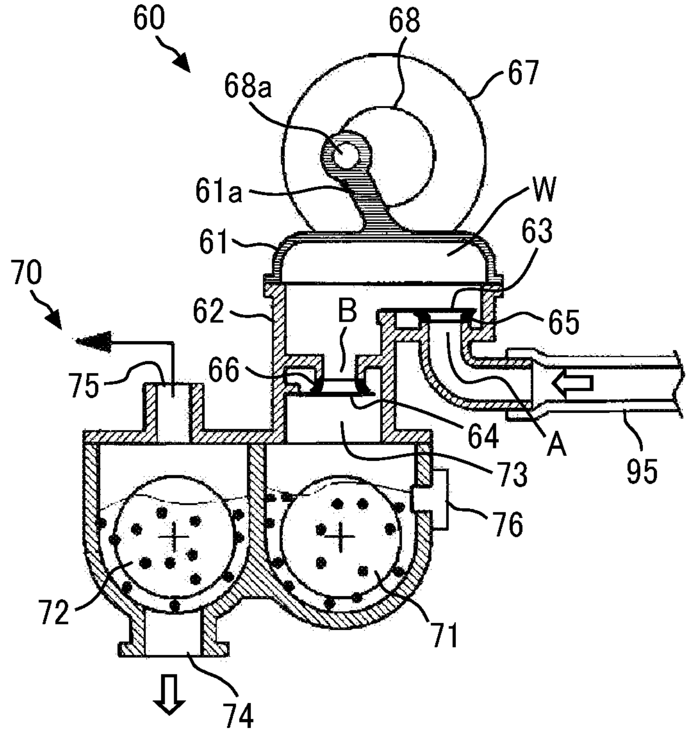
FIG. 4 is a cross-sectional view of a sub-hopper.

Next, the sub-hopper 70 in the developer supply device 90Y is described in detail with reference to FIG. 4. With reference to FIG. 4, the conveying pump 60 is integrated with the sub-hopper 70 in the present embodiment. The conveying pump 60 is a diaphragm pump (positive-displacement pump) and includes, for example, a diaphragm 61 (rubber), a case 62, a motor 67, a rotating plate 68, check valves 63 and 64, and seals 65 and 66 (elastic members). The conveying pump 60 with such a configuration is relatively small and low in cost.

A pump body includes the case 62 and the diaphragm 61. The case 62 is made of a resin material or a metal material having rigidity and functions as a main part (housing) of the pump body. The case 62 has an inlet A and an outlet B. The developer together with air flows toward an inside of the case 62 through the inlet A. The developer together with air flows out from the inside of the case 62 through the outlet B. The diaphragm 61 is formed of a rubber material having elasticity and a low affinity for toner. The interior of a bowl-shaped portion functions as a variable volume portion W. An arm 61*a* stands on the outer periphery of the diaphragm 61. An eccentric shaft 68*a* of the rotating plate 68 is fitted into a hole of the arm 61*a*. The diaphragm 61 is joined with the case 62 without a gap. The variable volume portion W of the diaphragm 61 and the interior of the case 62 are formed as one closed space inside the pump body. The diaphragm 61 expands and contracts by the rotation of the eccentric shaft 68*a* of the rotating plate 68 to be described later. Thus, the pump body (the diaphragm 61 and the case 62) increases and decreases the internal volume to alternately generate positive pressure and negative pressure.

The rotating plate 68 is disposed on a motor shaft of the motor 67. The eccentric shaft 68*a* is disposed on the surface of the rotating plate 68 to stand at a position eccentric from the motor shaft (rotational center). The eccentric shaft 68*a* of the rotating plate 68 is inserted (fitted) into the hole formed in a tip of the arm 61*a* of the diaphragm 61. With such a configuration, as the controller 120 controls to drive the motor 67 to rotate the rotating plate 68 (eccentric shaft 68*a*). Accordingly, the diaphragm 61 expands and contracts to increase and decrease the volume of the variable volume portion W periodically. With such expansion and contraction of the diaphragm 61, the positive pressure and the negative pressure are alternately generated inside the pump body (the diaphragm 61 and the case 62).

The inlet check valve 63 is disposed at the inlet A of the pump body (case 62). The inlet check valve 63 opens the inlet A when the negative pressure is generated inside the pump body (the diaphragm 61 and the case 62) and closes the inlet A when the positive pressure is generated inside the pump body (the diaphragm 61 and the case 62). The inlet check valve 63 is disposed opposite the inlet A from the inside of the pump body (the diaphragm 61 and the case 62). The developer receiving portion 81 is coupled to the inlet A side of the conveying pump 60 via the tube 95. On the other hand, the discharge port check valve 64 is disposed at the outlet B of the pump body (the case 62). The discharge port check valve 64 closes the outlet B when the negative pressure is generated inside the pump body (the diaphragm 61 and the case 62) and opens the outlet B when the positive pressure is generated inside the pump body (the diaphragm 61 and the case 62). The discharge port check valve 64 is disposed opposite the outlet B from the outside of the pump body (the diaphragm 61 and the case 62). The sub-hopper 70 is coupled to the outlet B side in the conveying pump 60. With such a configuration and operation, as described above with reference to FIG. 3, the conveying pump 60 operates to convey the toner into the sub-hopper 70 via the conveying pump 60 after the toner stored in the developer receiving portion 81 is sucked from the suction port 83 and conveyed through the tube 95. Specifically, when a hopper remaining amount sensor 76 of the sub-hopper 70 detects a shortage of toner in the sub-hopper 70, the controller 120 controls to drive the conveying pump 60 (motor 67) to supply the toner from the developer receiving portion 81 to the sub-hopper 70. The conveying pump 60 (motor 67) is intermittently driven in a relatively short cycle when the hopper remaining amount sensor 76 detects that the amount of the toner in the sub-hopper 70 has not reached a predetermined amount and is insufficient. As a result, a problem that the toner amount conveyed by conveying screws 71 and 72 in the sub-hopper 70 cannot catch up with the amount of the toner supplied from the conveying pump 60 and the toner stagnates in a part of the sub-hopper 70 can be prevented.

With reference to FIG. 4, the sub-hopper 70 is provided with, for example, the two conveying screws 71 and 72, the hopper remaining amount sensor 76, and a supply motor 121 (see FIG. 3). A supply port 73 communicating with the outlet B of the conveying pump 60 is disposed at an upper portion of an upstream side of a first conveyance passage (conveyance passage provided with a first conveying screw 71) of the sub-hopper 70. A discharge port 74 (serving as an opening) is formed at a lower portion of a downstream side of a second conveyance passage (i.e., conveyance passage provided with a second conveying screw 72) of the sub-hopper 70. The discharge port 74 is coupled to the supply tube 59 (see FIG. 3) of the developing device 5Y. An exhaust port 75 to discharge air blown together with the toner from the conveying pump 60 is disposed at an upper portion of the second conveyance passage of the sub-hopper 70. As described above, the hopper remaining amount sensor 76 functions as a detector that detects an insufficient state in which the toner (developer) contained in the sub-hopper 70 has not reached a predetermined amount.

In the sub-hopper 70, a downstream side of the first conveyance passage and an upstream side of the second conveyance passage in the conveyance direction of the toner communicate with each other on one end side in the longitudinal direction (direction perpendicular to the plane on which FIGS. 3 and 4 are illustrated) of the sub-hopper 70. The first conveyance passage and the second conveyance passage are separated by a wall except the communicating portion. The toner supplied into the sub-hopper 70 is conveyed through the first conveyance passage and the second conveyance passage in the sub-hopper 70 in this order by the conveying screws 71 and 72 rotationally driven by the supply motor 121. After that, the toner is supplied from the sub-hopper 70 into the developing device 5Y via the supply tube 59. Specifically, when the toner concentration sensor 56 of the developing device 5Y detects a shortage of the toner concentration in the developer housing (circulation passage in which the two conveying screws 55 circulate the toner), the controller 120 rotates the conveying screws 71 and 72 of the sub-hopper 70 to supply the toner from the sub-hopper 70 to the developing device 5Y. As described above, in the present embodiment, the conveyance passage of the toner from the developer receiving portion 81 to the conveying pump 60 is formed by the flexible tube 95. Accordingly, even in a case in which various parts are disposed in the space between the developer receiving portion 81 and the conveying pump 60, the conveyance passage of the toner can be formed by arranging the tube 95 to avoid these parts. As a result, the developer container mount 31Y of the toner container 32Y can be relatively freely laid out at a position away from the developing device 5Y.

Next, with reference to FIG. 3, configurations of the toner container 32Y and the developer supply device 90Y are described below. As described above, the toner container 32Y mainly includes the container body 33 and the cap 34 (plug) detachably attached to the toner discharge port C of the container body 33. The bottle gear 37 and the toner discharge port C are disposed on a head portion of the container body 33. The bottle gear 37 rotates together with the container body 33. The bottle gear 37 meshes with the drive gear 110 of the apparatus body of the image forming apparatus 100. The drive gear 110 drives the container body 33 to rotate the container body 33 in a predetermined direction. The discharge port C is for discharging toner (powder) contained in the container body 33 toward the dropping passage 82. The container body 33 has a helical projection 33*a* protruding inward from an outer circumferential surface to an inner circumferential surface of the container body 33. The helical projection 33*a* is for discharging toner from the container body 33 through the toner discharge port C of the toner container 32Y by rotation of the container body 33. The container body 33 having such a configuration can be produced together with the bottle gear 37 as a single unit by blow molding.

Figure 5A:
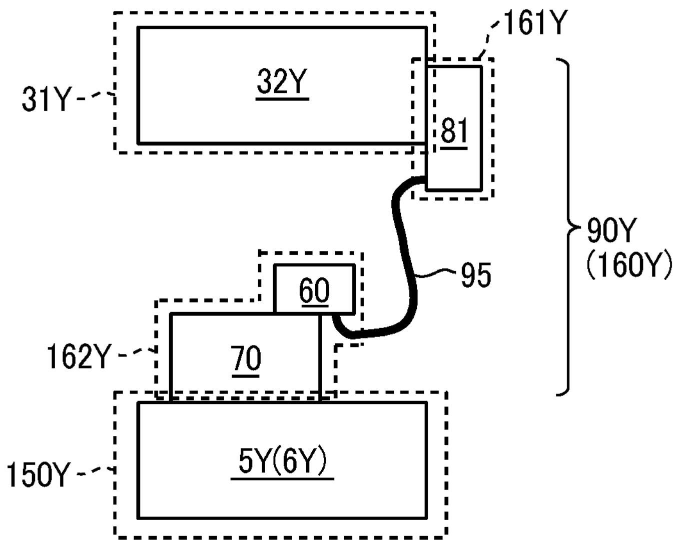
FIG. 5A is a diagram illustrating a state in which the developing device, the toner container, and the developer supply device are attached to an apparatus body of the image forming apparatus.

On the other hand, with reference to FIGS. 3 and 5A, the cap receiving portion 91 of the developer supply device 90Y is disposed to cover the head portion of the toner container 32Y in a state of being disposed in the developer container mount 31Y (developer supply device 90Y). The cap receiving portion 91 is provided with the cap opening-and-closing chuck 92 and an opening-and-closing driver. The cap opening-and-closing chuck 92 opens and closes the cap 34 in conjunction with an attachment and detachment operation of the toner container 32Y. The opening-and-closing driver drives the cap opening-and-closing chuck 92. The cap opening-and-closing chuck 92 and the opening-and-closing driver are disposed separately from the developer receiving portion 81. Then, when the toner container 32Y mounted on the developer container mount 31Y is slid toward the cap receiving portion 91 and the cap 34 reaches the position of the cap opening-and-closing chuck 92, the opening-and-closing driver operates to separate the cap 34 from the toner discharge port C in a state where the cap opening-and-closing chuck 92 nips the cap 34 in conjunction with the operation of further sliding and pushing the toner container 32Y. As a result, the toner discharge port C of the toner container 32Y is opened. Thus, the toner can be discharged from the toner discharge port C. In conjunction with such an attaching operation of the toner container 32Y, a lock mechanism provided as a part of the set detecting portion 98 is operated to lock the head side of the toner container 32Y so that the toner container 32Y is not removed from the developer container mount 31Y. At this time, the toner discharge port C (head portion) side of the toner container 32Y is rotatably fixed to the developer supply device 90Y (developer container mount 31Y). Thus, the container body 33 is rotatably held on the developer container mount 31Y. Such a normally set state is detected by the set detecting portion 98 (set detector). When the toner container 32Y is detached from the developer container mount 31Y (i.e., toner container rack), a reverse operation to the above-described operation at the time of attachment is performed.

The developer receiving portion 81 of the developer supply device 90Y is formed in a substantially bowl shape to store the toner dropped through the dropping passage 82. A toner detecting sensor 86 and a stirrer are disposed inside the developer receiving portion 81. The conveying pump 60 is coupled to the suction port 83 of the developer receiving portion 81 via the tube 95 and sucks and conveys the toner stored in the developer receiving portion 81 through the tube 95. As described above, in the present embodiment, the toner discharged from the toner container 32Y is not directly sucked by the conveying pump 60. A necessary amount of the toner discharged from the toner container 32Y and stored in the developer receiving portion 81 to some extent is sucked by the conveying pump 60. Thus, a failure that the amount of the toner sucked by the conveying pump 60 is short can be favorably reduced.

The toner detecting sensor 86 indirectly detects a state in which the toner contained in the toner container 32Y is depleted (i.e., toner end state), or a state close thereto (i.e., toner near end state) and is disposed near the suction port 83. Based on the detection result of the toner detecting sensor 86, the toner is discharged from the toner container 32Y. Specifically, for example, a piezoelectric sensor or a light transmission sensor can be used as the toner detecting sensor 86. In the present embodiment, a piezoelectric sensor is used as the toner detecting sensor 86. A height of the detection surface of the toner detecting sensor 86 is set so that the amount of the toner (deposition height) deposited above the suction port 83 is a target value. Based on the detection result of the toner detecting sensor 86, the controller 120 controls a drive timing and drive time of the drive motor 115 that rotationally drives the toner container 32Y (container body 33). Specifically, when the controller 120 determines that no toner is at the detection position based on the detection result of the toner detecting sensor 86, the drive motor 115 is driven for a predetermined time. On the other hand, when the controller 120 determines that the toner is present at the detection position based on the detection result of the toner detecting sensor 86, the drive motor 115 is stopped.

Hereinafter, the configuration and operation of the developer supply devices 90Y, 90M, 90C, 90K, and 90S for special color, which are characteristic in the present embodiment, are described with reference to FIGS. 5A to 7B. As described above with reference to FIG. 3, the developer supply devices 90Y, 90M, 90C, 90K, and 90S according to the present embodiment supply the toners as the developers contained in the toner containers 32Y, 32M, 32C, 32K and 32S as the developer containers in the apparatus body of the image forming apparatus 100 toward the developing devices 5Y, 5M, 5C, 5K, and 5S.

The five developer supply devices 90Y, 90M, 90C, 90K, and 90S have substantially the same configuration as the configuration of the developer supply device 90Y for yellow except that the color (type) of the toner used is different. Thus, the description of the other four developer supply devices 90M, 90C, 90K, and 90S are omitted as appropriate, and only the developer supply device for yellow is described. Similarly, developer supply device mounts 160Y, 160M, 160C, 160K, and 160S, the toner containers 32Y, 32M, 32C, 32K, and 32S (developer containers), the developer container mounts 31Y, 31M, 31C, 31K, and 31S, the developing devices 5Y, 5M, 5C, 5K, and 5S, and developing device mounts 150Y, 150M, 150C, 150K, and 150S corresponding to the five developer supply devices 90Y, 90M, 90C, 90K, and 90S have substantially the same structure as components for yellow, so that the descriptions of the other four colors are omitted and only the description for yellow is described.

In the five mounts (developer supply device mounts 160Y, 160M, 160C, 160K, and 160S, the developer container mounts 31Y, 31M, 31C, 31K, and 31S, and the developing device mounts 150Y, 150M, 150C, 150K, and 150S), descriptions of colors such as "yellow, magenta, cyan, black, and special colors", and symbols of colors such as "Y, M, C, K, and S" are arranged in the basic order illustrated in FIGS. 1 and 7A. The descriptions are given of the fixed positions that do not change even when the toner containers, developer supply devices, and developing devices are replaced. Specifically, with reference to FIGS. 7A and 7B, "the developer supply device mount 160S for special color", "the developer container mount 31S for special color", and "the developing device mount 150S for special color" are fixed at positions in the leftmost end. "The developer supply device mount 160Y for yellow", "the developer container mount 31Y for yellow", and "the developing device mount 150Y for yellow" are fixed at positions in the right thereof. "The developer supply device mount 160M for magenta", "the developer container mount 31M for magenta", and "the developing device mount 150M for magenta" are fixed at positions on further right thereof. "The developer supply device mount 160C for cyan", "the developer container mount 31C for cyan", and "the developing device mount 150C for cyan" are fixed at positions in the still further right thereof. "The developer supply device mount 160K for black", "the developer container mount 31K for black", and "the developing device mount 150K for black" are fixed at positions in the rightmost side thereof.

As described above with reference to FIG. 3, the developer supply device 90Y in the present embodiment mainly includes the developer receiving portion 81 (serving as a first storage), the sub-hopper 70 (serving as a second storage), and the tube 95 as the conveying tube. The developer receiving portion 81 can store the toner (developer) discharged from the toner container 32Y (developer container), has the conveyance passage (i.e., a portion provided with the suction port 83 (see FIG. 3) at the bottom of the developer receiving portion 81) to deliver the toner discharged from the toner container 32Y to the tube 95 (conveying tube), and is attachable to and detachable from the toner container 32Y. Specifically, the toner container 32Y and the developer receiving portion 81 (developer supply device 90Y) can be separately and independently attached to and detached from the apparatus body of the image forming apparatus 100. The sub-hopper 70 can store the toner (developer) discharged toward the developing device 5Y and is attachable to and detachable from the developing device 5Y. Specifically, the developing device 5Y and the sub-hopper 70 (developer supply device 90Y) can be separately and independently attached to and detached from the apparatus body of the image forming apparatus 100. As described above with reference to FIG. 3, the conveying pump 60 is integrate with the sub-hopper 70 in the present embodiment. In other words, the conveying pump 60 is subunitized in the sub-hopper 70. The tube 95 is a flexible conveying tube having one end connected to the developer receiving portion 81 and the other end connected to the sub-hopper 70 to convey the toner (developer) from the toner container 32Y (developer receiving portion) toward the sub-hopper 70.

With reference to FIG. 5, the developer supply device 90Y in the present embodiment is attached to and detached from the apparatus body of the image forming apparatus 100 while maintaining the connection between the developer receiving portion 81, the sub-hopper 70 (which is integrated with the conveying pump 60), and the tube 95 (conveying tube). In other words, the developer receiving portion 81 and the sub-hopper 70 are coupled via the tube 95 in the developer supply device 90Y. The developer receiving portion 81 is attachable to and detachable from the housing of the apparatus body of the image forming apparatus 100 without separating the connection between the developer receiving portion 81 and the sub-hopper 70 with respect to the housing of the apparatus body of the image forming apparatus 100. The developing device 5Y and the developer supply device 90Y in which the toner container 32Y, the developer receiving portion 81, and the sub-hopper 70 are coupled via the tube 95 can be separately and independently attached to and detached from the apparatus body of the image forming apparatus 100.

Specifically, as illustrated in FIGS. 5A to 7B, the apparatus body of the image forming apparatus 100 includes a plurality of developer supply device mounts (160Y, 160M, 160C, 160K, and 160S), a plurality of developer container mounts (31Y, 31M, 31C, 31K, and 31S), and a plurality of developing device mounts (150Y, 150M, 150C, 150K, and 150S). For example, the developer supply device 90Y is detachably attached to the developer supply device mount 160Y. For example, the toner container 32Y (developer containers) is detachably attached to the developer container mount 31Y. For example, the developing device 5Y is detachably attached to the developing device mount 150Y. The developer supply device mount 160Y includes a developer receiving portion mount 161Y and a sub-hopper mount 162Y. The developer receiving portion 81 is detachably attached to the developer receiving portion mount 161Y. The sub-hopper 70 (and the conveying pump 60) is detachably attached to the sub-hopper mount 162Y. Each of the developer container mount 31Y, the developing device mount 150Y, the developer receiving portion mount 161Y, and the sub-hopper mount 162Y (developer supply device mount 160Y) has an opening portion and a frame. The opening portion (formed to open on the front side in the attaching direction, on the right side in FIG. 5, and on the front side perpendicular to the plane on which FIGS. 6A to 6E is illustrated) is for attaching and detaching the corresponding unit to and from the apparatus body of the image forming apparatus 100. The frame is for holding the unit in the apparatus body of the image forming apparatus 100.

Figure 6A:
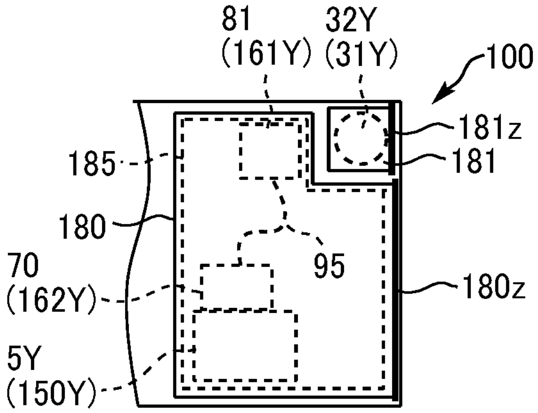
FIG. 6A is a diagram illustrating a procedure of detaching the developing device, the toner container, and the developer supply device from the apparatus body of the image forming apparatus.
Figure 6B:
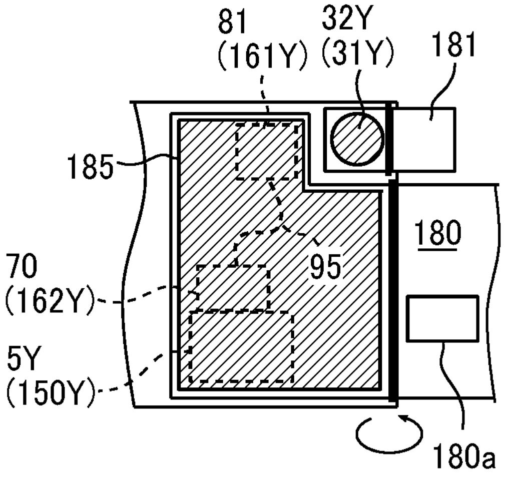
FIG. 6B is a diagram illustrating a state in which a body cover and a sub body cover are detached, subsequent to the state in FIG. 6A.
Figure 6C:
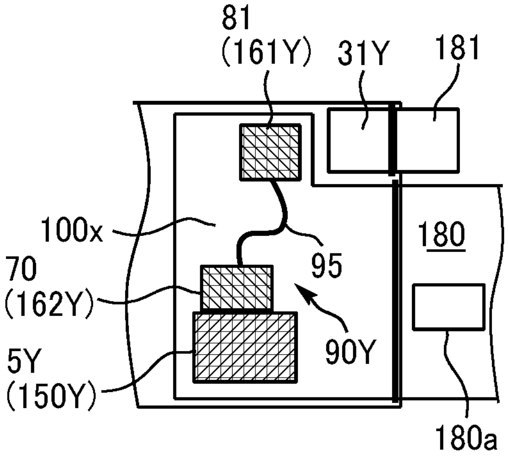
FIG. 6C is a diagram illustrating a state in which an inner cover is further detached, subsequent to the state in FIG. 6B.
Figure 6D:
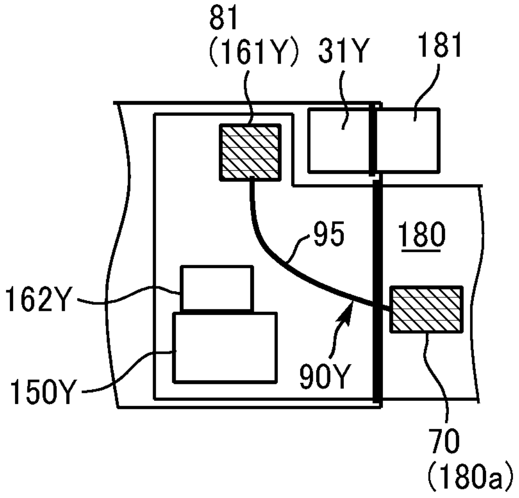
FIG. 6D is a diagram illustrating a state in which a sub-hopper is detached and attached to a sub-hopper holding portion, subsequent to the state in FIG. 6C.

With reference to FIGS. 6A to 6E, in the present embodiment, the apparatus body of the image forming apparatus 100 includes the developer supply device mount 160Y (developer receiving portion mount 161Y, sub-hopper mount 162Y), a body cover 180, and a sub-body cover 181. The body cover 180 opens and closes the developing device mount 150Y. The sub-body cover 181 opens and closes the developer container mount 31Y. Specifically, with reference to FIGS. 6A and 6B, the body cover 180 is rotatable around a hinge 180*z*, and the sub-body cover 181 is rotatable around a hinge 181*z*. With reference to FIG. 6D, the body cover 180 is provided with a sub-hopper holding portion 180*a* that can temporarily hold the sub-hopper 70 with the developer receiving portion mount 161Y and the sub-hopper mount 162Y (developer supply device mount 160Y) open. Specifically, the sub-hopper holding portion 180*a* is provided on a back surface of the body cover 180 (surface facing the developer supply device mount 160Y in a closed state). A hooked portion for hooking a hook portion of the sub-hopper 70 is formed. As described above, the sub-hopper holding portion 180*a* is disposed in the body cover 180, so that the attachment and detachment operation of the developer supply device 90Y can be smoothly performed.

Hereinafter, with reference to FIGS. 6A to 6E, a procedure of removing the toner container 32Y, the developing device 5Y, and the developer supply device 90Y from the apparatus body of the image forming apparatus 100 is described. First, a state in which the body cover 180 and the sub-body cover 181 are closed as illustrated in FIG. 6A changes to a state in which the body cover 180 and the sub-body cover 181 are opened (rotated around the hinges 180*z* and 181*z*) as illustrated in FIG. 6B. As a result, as illustrated in FIG. 6B, an inner cover 185 is exposed and the toner container 32Y is also exposed. After that, as illustrated in FIG. 6C, when the inner cover 185 is detached, the inside thereof (an opening portion 100*x*) is exposed. The opening portion 100*x* is provided with the developer receiving portion mount 161Y, the sub-hopper mount 162Y (developer supply device mount 160Y), and the developing device mount 150Y. The toner container 32Y is also removed toward the front side in the direction perpendicular to the plane on which FIG. 6C is illustrated before or after the inner cover 185 is removed. The attachment and detachment of the toner container 32Y are performed not only at the time of attachment to and detachment from the developer supply device 90Y and the developing device 5Y but also independently when the toner in the toner container 32Y is empty (i.e., in a toner end state).

Figure 6E:
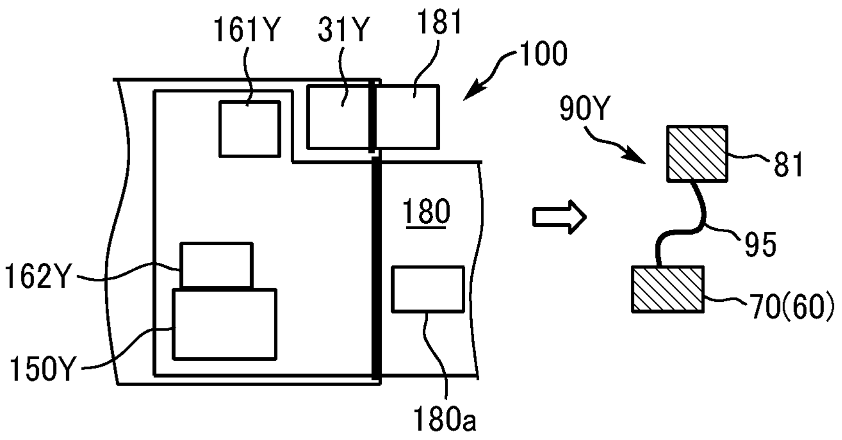
FIG. 6E is a diagram illustrating a state in which a developer supply device is detached and a removal operation is completed, subsequent to the state in FIG. 6D.

After that, as illustrated in FIG. 6D, the sub-hopper 70 is removed from the sub-hopper mount 162Y. Subsequently, the removed sub-hopper 70 (which remains connected to the developer receiving portion 81 via the tube 95) is temporarily set to the sub-hopper holding portion 180*a*. In order to enable such an operation, the length of the tube 95 and the position of the sub-hopper holding portion 180*a* are optimized. Prior to the removal operation of the sub-hopper 70, the developing device 5Y is removed from the developing device mount 150Y toward the front side in the direction perpendicular to the plane on which FIG. 6D is illustrated. Finally, as illustrated in FIG. 6E, the developer receiving portion 81 is removed from the developer receiving portion mount 161Y toward the front side in the direction perpendicular to the plane on which FIG. 6E is illustrated, and the sub-hopper 70 is removed from the sub-hopper holding portion 180*a*. Thus, the operation of taking out the developer supply device 90Y (in which the developer receiving portion 81 and the sub-hopper 70 remain connected via the tube 95) from the apparatus body of the image forming apparatus 100 is completed.

When the toner container 32Y, the developing device 5Y, and the developer supply device 90Y are attached to the apparatus body of the image forming apparatus 100, a procedure reverse to the procedure in FIGS. 6A to 6E described above is performed. Such an attaching and detaching operation is performed when an operator such as a service person performs replacement or maintenance of the developer supply device 90Y, or when a set of the toner container 32Y, the developing device 5Y, and the developer supply device 90Y is replaced with a set of a toner container, a developing device, and a developer supply device for a different color (including a case in which the toner container 32Y, the developing device 5Y, and the developer supply device 90Y are attached to the mounts for a different color).

In the present embodiment, the housing of the apparatus body of the image forming apparatus 100 is provided with the opening portion 100*x* (see FIG. 6C). A tube connecting portion of the developer receiving portion 81 or a portion of the tube 95 near the developer receiving portion 81, and a tube connecting portion of the sub-hopper 70 or a portion of the tube 95 near the sub-hopper 70, are inserted in the opening portion 100*x*. Specifically, with reference to FIG. 6C, in a state where the developer receiving portion 81 is attached to the developer receiving portion mount 161Y and the sub-hopper 70 is attached to the sub-hopper mount 162Y, the tube 95 does not protrude from the apparatus body of the image forming apparatus 100 and is accommodated inside the apparatus body of the image forming apparatus 100 (i.e., in the developer supply device mount 160Y). Such a configuration can avoid deterioration of appearance of the image forming apparatus 100.

As described above, the developer supply device 90Y in the present embodiment is attachable to and detachable from the apparatus body of the image forming apparatus 100 while maintaining the connection among the developer receiving portion 81, the sub-hopper 70, and the tube 95. Accordingly, the operability of the attachment and detachment is enhanced as compared with a case where the developer supply device 90Y is attached to and detached from the apparatus body of the image forming apparatus 100 by releasing the connection between the developer receiving portion 81 and the tube 95 or releasing the connection between the sub-hopper 70 and the tube 95. In particular, when the connection between the developer receiving portion 81 and the tube 95 is released or the connection between the sub-hopper 70 and the tube 95 is released, the above-described configuration according to the present embodiment can reduce the occurrence of a failure that the toner clogged in the tube is scattered.

With reference to FIGS. 7A and 7B, in the image forming apparatus 100 according to the present embodiment, each of the plurality of developer supply devices 90Y, 90M, 90C, 90K, and 90S can be attached to any of the plurality of developer supply device mounts 160Y, 160M, 160C, 160K, and 160S in a state where the tube 95 is accommodated in the apparatus body of the image forming apparatus 100. Specifically, the five developer supply device mounts 160Y, 160M, 160C, 160K, and 160S have the same configuration except for their positions. The five developer supply devices 90Y, 90M, 90C, 90K, and 90S have the same shape except for the colors of the toner to be handled. Each of the plurality of developing devices 5Y, 5M, 5C, 5K, and 5S (process cartridges 6Y, 6M, 6C, 6K, and 6S) is attachable to any of the plurality of developing device mounts 150Y, 150M, 150C, 150K, and 150S (process cartridge mounts). Specifically, the five developing device mounts 150Y, 150M, 150C, 150K, and 150S have the same configuration except for positions thereof. The five developing devices 5Y, 5M, 5C, 5K, and 5S (process cartridges) have the same shape except for the colors of the toners to be handled. Further, each of the plurality of toner containers 32Y, 32M, 32C, 32K, and 32S (developer containers) is attachable to any of the plurality of developer container mounts 31Y, 31M, 31C, 31K, and 31S. Specifically, the five developer container mounts 31Y, 31M, 31C, 31K, and 31S have the same configuration except for the positions thereof. The five toner containers 32Y, 32M, 32C, 32K, and 32S have the same shape except for the colors of the toners to be handled.

FIGS. 7A and 7B illustrate a state in which the arrangement of the developing device 5K (process cartridge 6K), the developer supply device 90K, and the toner container 32K for black is replaced with the arrangement of the developing device 5S (process cartridge 6S), the developer supply device 90S, and the toner container 32S for special color. Further, the arrangements of devices for other colors can be freely interchanged.

Such a configuration, in which units of different colors (toner containers, developing devices, and developer supply devices) are replaced each other, has a possibility that the units may be disposed at unintended positions due to an operator error. In the present embodiment, in order to prevent an occurrence of such a problem, an identification (ID) chip (information storage member) that specifies the color of the unit is disposed on the unit. A reading device (information reader) that reads information of the ID chip of the unit is disposed on the mount (developer container mount, developing device mount, and developer supply device mount). When the information of the unit read by the reading device is different from target information, the controller displays an alert on a display panel.

Figure 5B:
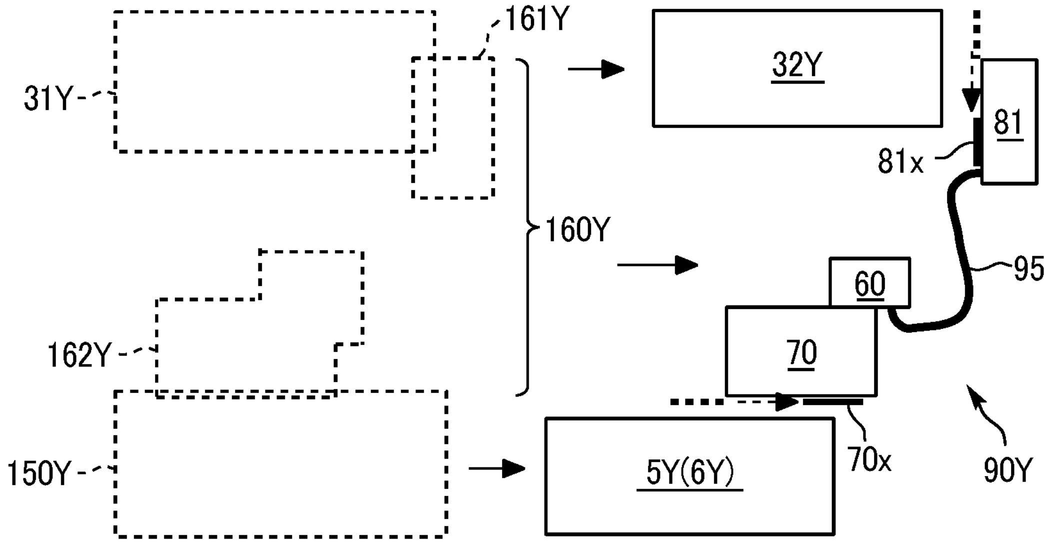
FIG. 5B is a diagram illustrating a state in which the developing device, the toner container, and the developer supply device are detached from the apparatus body of the image forming apparatus.

With reference to FIG. 5B, in the present embodiment, the developer receiving portion 81 is provided with a shutter 81*x* (serving as an opening-and-closing member) that opens and closes an opening communicating with the toner container 32Y in conjunction with an attaching and detaching operation with respect to the apparatus body of the image forming apparatus 100. Specifically, the developer receiving portion 81 is provided with the shutter 81*x* that is movable in directions of opening and closing the opening, and a spring that urges the shutter 81*x* in the closing direction. When the developer receiving portion 81 is removed from the developer receiving portion mount 161Y, the contact between the shutter 81*x* and a stopper that pushes the shutter 81*x* against a biasing force of the spring in the developer receiving portion mount 161Y is released. Thus, the shutter 81*x* moves from the opening position (i.e., the position illustrated by a dashed line in FIG. 5B) to the closed position (i.e., the position illustrated by a solid line in FIG. 5B), and the opening is closed by the shutter 81*x*. When the developer receiving portion 81 is attached to the developer receiving portion mount 161Y, a reverse operation to the above-described operation at the time of attachment is performed, and the opening is opened by the shutter 81*x*. Such a configuration can reduce a problem that the toner scatters at the time of attaching and detaching operations of the developer supply device 90Y.

With reference to FIG. 5B, in the present embodiment, the sub-hopper 70 is provided with a shutter 70*x* (serving as an opening-and-closing member) that opens and closes the discharge port 74 (see FIG. 4) communicating with the developing device 5Y in conjunction with an attachment and detachment operation with respect to the apparatus body of the image forming apparatus 100. Specifically, the sub-hopper 70 is provided with the shutter 70*x* and a spring. The shutter 70*x* is movable in a direction in which the discharge port 74 is opened and closed. The spring biases the shutter 70*x* in a closing direction. When the sub-hopper 70 is removed from the sub-hopper mount 162Y, the contact between a stopper that pushes the shutter 70*x* against a biasing force of a spring in the sub-hopper mount 162Y, and the shutter 70*x* is released. Thus, the shutter 70*x* moves from the opening position (position illustrated by dashed lines in FIG. 5B) to the closed position (i.e., position illustrated by solid lines in FIG. 5B), and the discharge port 74 (serving as an opening) is closed by the shutter 70*x*. When the sub-hopper 70 is attached to the sub-hopper mount 162Y, a reverse operation to the above-described operation at the time of attachment is performed, and the opening is opened by the shutter 70*x*. Such a configuration can reduce a problem that the toner scatters at the time of attaching and detaching operation of the developer supply device 90Y.

First Modification

Figure 8A:
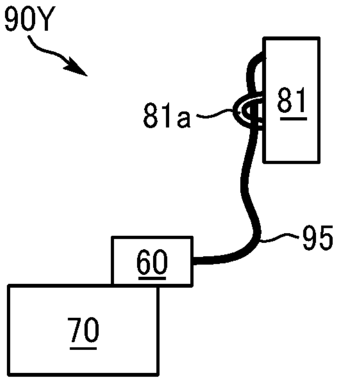
FIG. 8A is a schematic view of a developer supply device as a first modification.

As illustrated in FIG. 8A, the developer receiving portion 81 of the developer supply device 90Y in a first modification of the present embodiment is provided with a holding portion 81*a* that holds the tube 95 as the conveying tube. Specifically, the holding portion 81*a* is formed on an outer surface of the case of the developer receiving portion 81 and loosely holds a part of the tube 95. Providing with the holding portion 81*a* in this manner can reduce a failure in which the flexible tube 95 is entangled with another member compared to a case where the holding portion 81*a* is not provided. Although the holding portion 81*a* is provided with the developer receiving portion 81 in the first modification, the holding portion 81*a* may be provided in the sub-hopper 70.

Figure 8B:
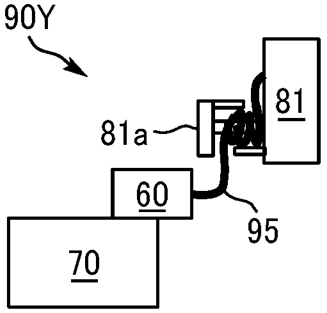
FIG. 8B is a schematic view of the developer supply device as the first modification in which a part of a conveying tube in FIG. 8A is windable with respect to a holding portion of a developer receiving portion.

As another aspect in the first modification, the developer supply device 90Y illustrated in FIG. 8B has a configuration in which a part of the tube 95 is windable with respect to the holding portion 81*a* of the developer receiving portion 81. Specifically, the holding portion 81*a* illustrated in FIG. 8B is provided with a rotation shaft to manually or automatically wind the tube 95. An operator pulls out the tube 95 from the holding portion 81*a* or winds the tube 95 around the holding portion 81*a* as necessary at the time of attachment and detachment operation of the developer supply device 90Y. Providing with the winding-type holding portion 81*a* in this manner can further reduce a failure that the flexible tube 95 is entangled with other members.

Second Modification

Figure 9:
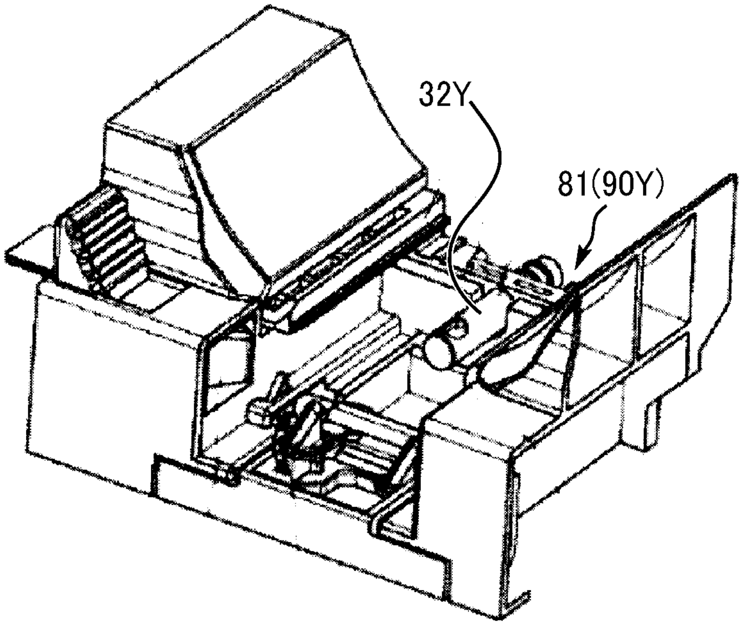
FIG. 9 is a schematic view of a toner container, a developer receiving portion, and a vicinity thereof as a second modification.
Figure 10:
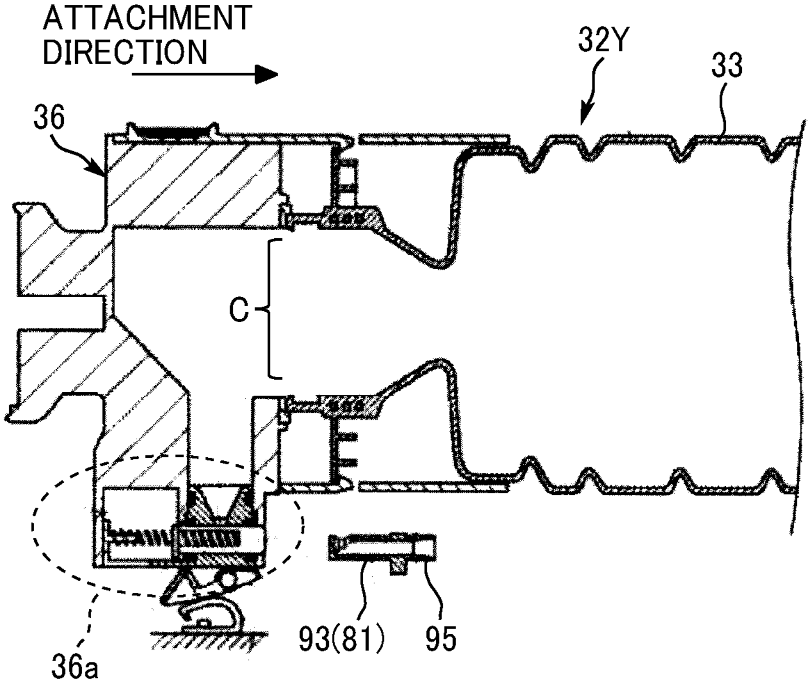
FIG. 10 is a cross-sectional view of a part of the toner container in FIG. 9.

As illustrated in FIGS. 9 and 10, the developer receiving portion 81 of the developer supply device 90Y in a second modification of the present embodiment also has the nozzle 93 (conveyance passage) that delivers the toner discharged from the toner container 32Y to the tube 95. The developer receiving portion 81 is attachable to and detachable from the toner container 32Y. The developer receiving portion 81 in the second modification is not provided with a storage portion to store the toner discharged from the toner container 32Y. Accordingly, a toner discharge port 36*a* of a cap 36 is attached to and detached from the nozzle 93 (i.e., as a conveyance passage in the developer receiving portion 81 and is coupled to the tube 95 serving as a conveying tube) in conjunction with an operation of attaching to and detaching from the developer supply device 90Y. Then, the toner discharged from the toner container 32Y is supplied to the developing device 5Y via the nozzle 93 (developer receiving portion 81), the tube 95, and the sub-hopper 70 in a state where the toner container 32Y (toner discharge port 36*a*) is attached to the nozzle 93 (developer receiving portion 81) serving as a conveyance passage. Also in the second modification, the developer supply device 90Y is attached to and detached from the apparatus body of the image forming apparatus 100 while maintaining the connection among the developer receiving portion 81 (nozzle 93), the sub-hopper 70, and the tube 95. As a result, the developer supply device 90Y can be easily attached to and detached from the apparatus body of the image forming apparatus 100.

As described above, the developer supply device 90Y according to the present embodiment supplies toner (serving as the developer) contained in the toner container 32Y (serving as the developer container) toward the developing device 5Y in the apparatus body of the image forming apparatus 100. The developer supply device 90Y includes the conveyance passage, the developer receiving portion 81, the sub-hopper 70, and the tube 95 (serving as the conveying tube). The conveyance passage delivers the developer discharged from the toner container 32Y to the tube 95. The developer receiving portion 81 is detachably attached to the toner container 32Y. The sub-hopper 70 contains the developer discharged toward the developing device 5Y and is detachably attachable to the developing device 5Y. The tube 95 has flexibility, and has a first end coupled to the developer receiving portion 81 and a second end coupled to the sub-hopper 70 to convey the developer from the developer receiving portion 81 to the sub-hopper 70. The developer supply device 90Y is attached to and detached from the apparatus body of the image forming apparatus 100 while maintaining the connection among the developer receiving portion 81, the sub-hopper 70, and the tube 95. As a result, the developer supply device 90Y can be easily attached to and detached from the apparatus body of the image forming apparatus 100.

In the present embodiment, the developing device 5Y, the photoconductor drum 1Y (image bearer), the charging device 4Y, and the cleaning device 2Y are united as the process cartridge 6Y. The present disclosure is not limited to the embodiment described above and can be applied to the apparatus body of the image forming apparatus 100 in which the developing device 5Y is detachably attached as a single unit. It is to be noted that the term "process cartridge" used in the present specification is defined as a unit detachably attached together to an apparatus body of an image forming apparatus. In the process cartridge, an image bearer is united together with at least one of the charging device to charge the image bearer, the developing device to develop latent images on the image bearer, and the cleaner to clean the image bearer.

In the present embodiment, the developer supply device 90S is provided with the toner container 32S in which the substantially cylindrical container body is driven to rotate. The shape of the toner container disposed in the toner supply device is not limited thereto. In some embodiments, for example, a box-shaped toner container may be disposed in the developer supply device. In the present embodiment, the developer supply device 90Y supplies the toner as the developer contained in the toner container 32Y (developer container). In some embodiments, for example, the developer supply device may supply two-component developer (i.e., which contains toner and carrier) as developer contained in the developer container. In this case, as the two-component developer is supplied to the inside of the developing device, surplus two-component developer (carrier) is discharged to the outside of the device. Even in such a case, an advantageous effect equivalent to that of the present embodiment can be obtained.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

REFERENCE SIGNS LIST

5Y, 5M, 5C, 5K, 5S Developing device
6Y, 6M, 6C, 6K, 6S Process cartridge
31Y, 31M, 31C, 31K, 31S Developer container mount
32Y, 32M, 32C, 32K, 32S Toner container (Developer container)
60 Conveying pump
70 Sub-hopper (Second storage)
70*x* Shutter (Opening-and-closing member)
81 Developer receiving portion (First storage)
81*a* Holding portion
81*x* Shutter (Opening-and-closing member)
90Y, 90M, 90C, 90K, 90S Developer supply device
95 Tube (Conveying tube)
98 Set detecting portion (Set detector)
100 Image forming apparatus (Apparatus body of Image forming apparatus, housing)
150Y, 150M, 150C, 150K, 150S Developing device mount
160Y, 160M, 160C, 160K, 160S Developer supply device mount
161 Y Developer receiving portion mount
162Y Sub-hopper mount
180 Body cover
180*a* Sub-hopper holding portion
185 Inner cover

The invention claimed is:

1. A developer supply device for supplying developer contained in a developer container toward a developing device in an apparatus body of an image forming apparatus, the developer supply device comprising:

a conveyance passage to deliver the developer discharged from the developer container;

a developer receptacle detachable and attachable with respect to the developer container;

a sub-hopper detachable and attachable with respect to the developing device, the sub-hopper to store the developer discharged toward the developing device;

a controller configured to receive information of a detection of a shortage from the developing device and control the sub-hopper to supply the developer toward the developing device in response to the detection of the shortage;

a conveying tube having flexibility, the conveying tube having a first end portion coupled to the developer receptacle and a second end portion coupled to the sub-hopper, the conveying tube to convey the developer from the developer receptacle to the sub-hopper; and a holder including a shaft and configured to hold the conveying tube in the developer receptacle or the sub-hopper, wherein the developer supply device is detachable from and attachable to the apparatus body of the image forming apparatus with a connection among the developer receptacle, the sub-hopper, and the conveying tube being maintained, and the holder is configured to wind a part of the conveying tube.

2. The developer supply device according to claim 1, wherein the developer receptacle includes an opener to open and close an opening communicating with the developer container in conjunction with attachment and detachment operations with respect to the apparatus body of the image forming apparatus.

3. The developer supply device according to claim 2, wherein the developer receptacle includes a set detector to detect whether the developer container is correctly set with the developer supply device being attached to the apparatus body of the image forming apparatus.

4. The developer supply device according to claim 2, wherein the sub-hopper includes a corresponding opener to open and close a corresponding opening communicating with the developing device in conjunction with attachment and detachment operations with respect to the apparatus body of the image forming apparatus.

5. An image forming apparatus comprising:

a plurality of developer supply device mounts to each of which the developer supply device according to claim 4 is detachably attached;

a plurality of developer container mounts to each of which the developer container is detachably attached; and a plurality of developing device mounts to each of which the developing device is detachably attached, wherein the plurality of developer supply device mounts, the plurality of developer container mounts, and the plurality of developing device mounts are disposed in the apparatus body.

6. The image forming apparatus according to claim 5, wherein the developer supply device is attachable to any one of the plurality of developer supply device mounts with the conveying tube being accommodated in the apparatus body, and wherein the developing device is attachable to any one of the plurality of developing device mounts.

7. The developer supply device according to claim 1, wherein the developer receptacle includes a set detector to detect whether the developer container is correctly set with the developer supply device being attached to the apparatus body of the image forming apparatus.

8. The developer supply device according to claim 7, wherein the sub-hopper includes an opener to open and close an opening communicating with the developing device in conjunction with attachment and detachment operations with respect to the apparatus body of the image forming apparatus.

9. An image forming apparatus comprising:

a plurality of developer supply device mounts to each of which the developer supply device according to claim 5 is detachably attached;

a plurality of developer container mounts to each of which the developer container is detachably attached; and a plurality of developing device mounts to each of which the developing device is detachably attached, wherein the plurality of developer supply device mounts, the plurality of developer container mounts, and the plurality of developing device mounts are disposed in the apparatus body.

10. The image forming apparatus according to claim 9, wherein the developer supply device is attachable to any one of the plurality of developer supply device mounts with the conveying tube being accommodated in the apparatus body, and wherein the developing device is attachable to any one of the plurality of developing device mounts.

11. The developer supply device according to claim 1, wherein the sub-hopper includes an opener to open and close an opening communicating with the developing device in conjunction with attachment and detachment operations with respect to the apparatus body of the image forming apparatus.

12. An image forming apparatus comprising:

a plurality of developer supply device mounts to each of which the developer supply device according to claim 6 is detachably attached;

a plurality of developer container mounts to each of which the developer container is detachably attached; and a plurality of developing device mounts to each of which the developing device is detachably attached, wherein the plurality of developer supply device mounts, the plurality of developer container mounts, and the plurality of developing device mounts are disposed in the apparatus body.

13. The image forming apparatus according to claim 12, wherein the developer supply device is attachable to any one of the plurality of developer supply device mounts with the conveying tube being accommodated in the apparatus body, and wherein the developing device is attachable to any one of the plurality of developing device mounts.

14. An image forming apparatus comprising:

a plurality of developer supply device mounts to each of which the developer supply device according to claim 1 is detachably attached;

a plurality of developer container mounts to each of which the developer container is detachably attached; and a plurality of developing device mounts to each of which the developing device is detachably attached, wherein the plurality of developer supply device mounts, the plurality of developer container mounts, and the plurality of developing device mounts are disposed in the apparatus body.

15. The image forming apparatus according to claim 14, wherein the developer supply device is attachable to any one of the plurality of developer supply device mounts with the conveying tube being accommodated in the apparatus body, and wherein the developing device is attachable to any one of the plurality of developing device mounts.

16. The image forming apparatus according to claim 14, wherein the apparatus body includes a body cover to open and close a corresponding one of the plurality of developer supply device mounts, and wherein the body cover includes a sub-hopper holder to temporarily hold the sub-hopper with the corresponding one of the plurality of developer supply device mounts being open.

17. An image forming apparatus comprising:

a housing including a developing device;

a developer supply device including:

a developer receptacle;

a sub-hopper; and a conveying tube coupling the developer receptacle and the sub-hopper;

a holder including a shaft and configured to hold the conveying tube in the developer receptacle or the sub-hopper; and a controller configured to receive information of a detection of a shortage from the developing device and control the sub-hopper to supply developer toward the developing device in response to the detection of the shortage, wherein the developer supply device is detachable from and attachable to the housing without separating a connection among the developer receptacle, the sub-hopper, and the conveying tube with respect to the housing, and the holder is configured to wind a part of the conveying tube.

18. The image forming apparatus according to claim 17, wherein the housing includes an opening portion, and wherein a tube-coupling portion of the developer receptacle or a portion of the conveying tube near the developer receptacle, and a tube-coupling portion of the sub-hopper or a portion of the conveying tube near the sub-hopper are inserted into the opening portion.

* * * * *